United States Patent
Mahmoud et al.

(10) Patent No.: US 12,493,840 B2
(45) Date of Patent: Dec. 9, 2025

(54) ONTOLOGY BASED WORKFLOW AUTOMATION AND EXECUTION

(71) Applicant: International Business Machines Corporation, Armonk, NY (US)

(72) Inventors: Ossama Mahmoud, London (CA); Sonali Dey, London (CA); Nikhil Bhambra, Oakville (CA); Jamil Tahsin Samouh, Mississauga (CA); Isabella Olivares, Mississauga (CA); Shayne Yi Hsien Lin, Toronto (CA); Yazan Obeidi, Markham (CA); Sebastian Carbajales, Mississauga (CA); John Henry Green, Ontario (CA); Salman Saleem Sheikh, Sanford, FL (US); Yara Rizk, Cambridge, MA (US); Mahmoud Mahmoud, Mississauga (CA); Allen Vi Cuong Chan, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 18/495,228

(22) Filed: Oct. 26, 2023

(65) Prior Publication Data
US 2025/0139551 A1    May 1, 2025

(51) Int. Cl.
*G06Q 10/0631* (2023.01)
(52) U.S. Cl.
CPC .................. *G06Q 10/06316* (2013.01)

(58) Field of Classification Search
CPC ............. G06Q 10/063; G06Q 10/0631; G06Q 10/06316
See application file for complete search history.

(56) References Cited

U.S. PATENT DOCUMENTS

| 8,396,815 | B2 | 3/2013 | Drory et al. |
| 8,725,645 | B1* | 5/2014 | Montini ................ G06F 21/125 |
| | | | 705/52 |

(Continued)

FOREIGN PATENT DOCUMENTS

| CN | 119904178 A | 4/2025 |
| KR | 101511831 B1 | 4/2015 |
| WO | 2021219234 A1 | 11/2021 |

OTHER PUBLICATIONS

Leno, V., Polyvyanyy, A., Dumas, M. et al. Robotic Process Mining: Vision and Challenges. Bus Inf Syst Eng 63, 301-314 (2020). (Year: 2020).*

*Primary Examiner* — William S Brockington, III
(74) *Attorney, Agent, or Firm* — Garg Law Firm, PLLC; Rakesh Garg; Rakesh Roy

(57) ABSTRACT

An embodiment records execution of a workflow comprising a skill, the recording generating workflow data. An embodiment selects, using the workflow data, an ontology tree having above a threshold amount of similarity to the workflow. An embodiment constructs, using the ontology tree and the workflow data, a first skill tree corresponding to the workflow. An embodiment integrates, into an existing skill tree of an application, the first skill tree, the integrating resulting in an integrated skill tree of the application. An embodiment executes, responsive to an intent requesting execution of the skill using new data, using the integrated skill tree and the new data, the skill.

19 Claims, 9 Drawing Sheets

(56) References Cited

U.S. PATENT DOCUMENTS

| | | |
|---|---|---|
| 10,354,225 B2 | 7/2019 | Sharma et al. |
| 10,839,404 B2 | 11/2020 | Ramamurthy et al. |
| 2009/0037240 A1 | 2/2009 | Schmidt et al. |
| 2018/0165604 A1 | 6/2018 | Minkin et al. |
| 2018/0197123 A1 | 7/2018 | Parimelazhagan et al. |
| 2018/0276278 A1 | 9/2018 | Cagan et al. |
| 2020/0206920 A1* | 7/2020 | Ma .................... G06F 11/3476 |
| 2022/0113994 A1 | 4/2022 | Singh |
| 2022/0229636 A1* | 7/2022 | Nayak .................... G06N 20/00 |
| 2024/0134682 A1* | 4/2024 | Kulkarni .......... G06Q 10/06316 |

* cited by examiner

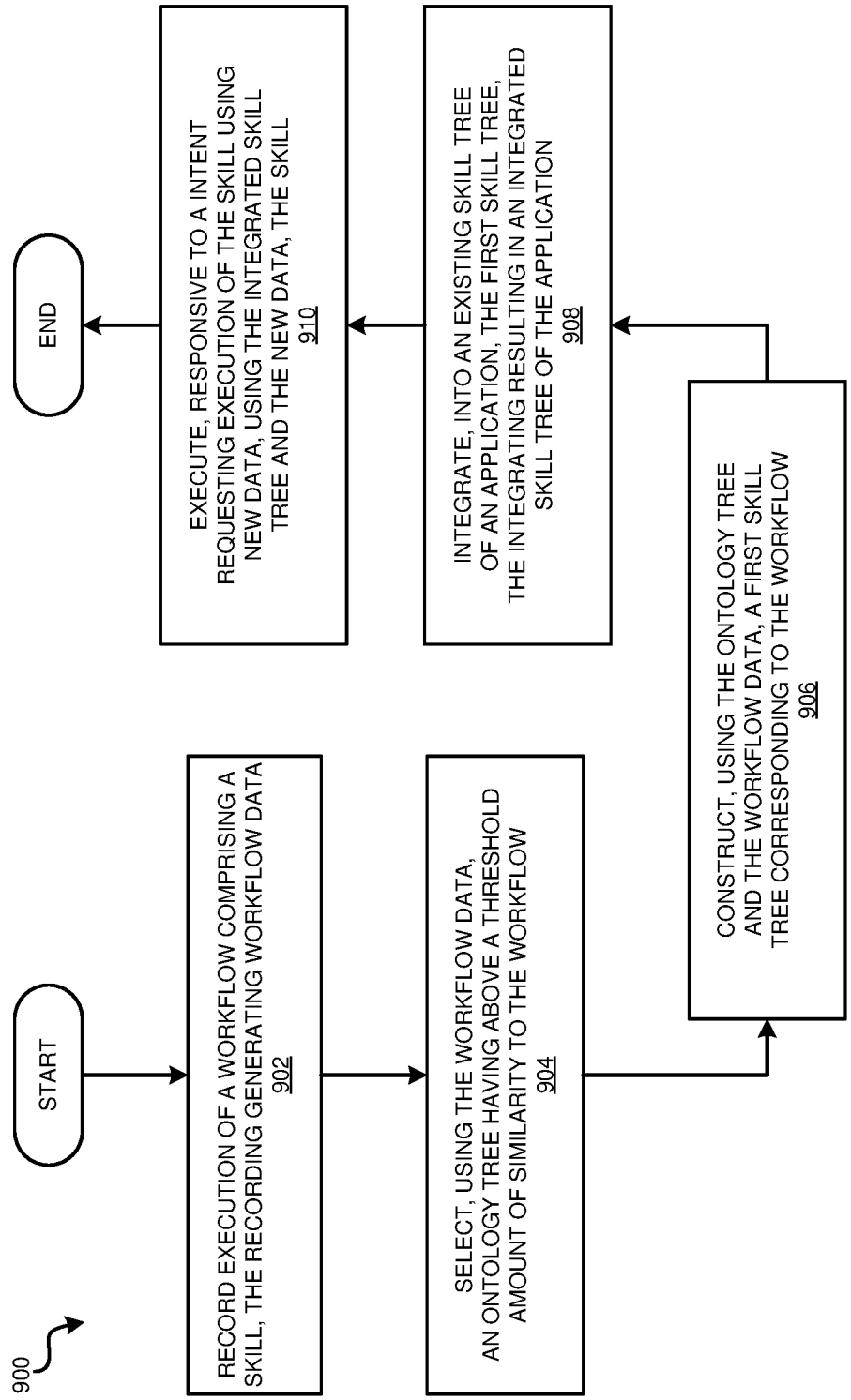

ONTOLOGY BASED WORKFLOW AUTOMATION AND EXECUTION

BACKGROUND

The present invention relates generally to workflow automation. More particularly, the present invention relates to a method, system, and computer program for ontology based workflow automation and execution.

Workflow automation refers to a process of automating execution of a sequence of tasks (i.e., a workflow) by a computer. For example, a workflow might include all the tasks involved in composing an email (e.g., open an email application, select "compose", select one or more addressees, enter text in the "subject" field, and enter text in the main body of the email). Automating this workflow allows execution of the entire sequence with one command and optional arguments (e.g., "e-mail Laura, reminding her about Tuesday's meeting"). Automating a workflow is useful in a variety of contexts, but is especially useful when used in conjunction with a natural language-based virtual assistant that communicates with a user using spoken commands.

A virtual assistant is software agent that can perform a range of tasks or services for a user based on user input such as commands or questions, including verbal ones. A skill is a named workflow, i.e., one or more tasks a software application knows how to perform. Some skills are pre-programmed, while others can be added to a virtual assistant or automation implementation after the virtual assistant or automation implementation is deployed for use.

An intent refers to an action that fulfills a user's request, for example by invoking one or more skills. Intents can optionally have arguments with placeholders called slots. For example, an intent invoking an email skill might be "e-mail Laura, reminding her about Tuesday's meeting"), where "Laura" and "reminding her about Tuesday's meeting" are arguments that are filled into slots when invoking the email skill.

An ontology is a representation, formal naming, and definition of the categories, properties, and relations between the concepts, data, and entities that substantiate a subject matter domain. An ontology is a way of organizing the properties of a subject matter domain and how those properties are related, by defining a set of concepts and categories that represent the subject matter domain.

The illustrative embodiments recognize that organizations are investing in automating workflows using a variety of software tools, thus increasing information technology infrastructure complexity. Different applications have different interfaces and features, and existing automation tools often rely on a specialized scripting language or visual sequencing interfaces which limit usability. Thus, there is a need for a workflow automation implementation that does not rely on a scripting language and is simple for a non-technical user to "teach" an automation tool a new skill.

One existing automation approach involves the use of a desktop recorder, which captures information about peripheral (e.g., mouse or keyboard) inputs and on-screen visual changes to capture a user's skill execution. This recording stream can be converted to a script which can be re-created on another user's desktop, thus implementing the automation. However, currently available robotic process automation (RPA) implementations are not capable of recognizing steps in the recording that may change from user to user. Existing RPA implementations often require a user to explicitly code an interaction in a specific logical sequence to enable effective generalization, which is difficult for a non-technical user. Often, a subject matter expert is required to automate a specific workflow. In addition, recording-based tools that rely only on specific input sequences (e.g., mouse clicks or keyboard entries) are fragile, breaking if a user interface of a particular application. As well, recording-based tools are application-specific (e.g., must be re-taught if a new application is substituted for an existing one), and thus the workflows they have been taught are not easily generalizable among applications of the same type. For example, the steps in composing an email tend to be similar among different email applications, even if the user interface of each application is slightly different. Thus, it would be useful to automate a workflow once, and generalize the workflow across similar applications with minimal additional application-specific effort.

Thus, the illustrative embodiments recognize that there is a need for a workflow automation implementation that does not rely on a scripting language, is simple for a non-technical user to "teach" an automation tool a new skill, and can be implemented by generalizing a single user demonstration of an example of the workflow to be automated.

SUMMARY

The illustrative embodiments provide for ontology based workflow automation and execution. An embodiment includes recording execution of a workflow comprising a skill, the recording generating workflow data. An embodiment includes selecting, using the workflow data, an ontology tree having above a threshold amount of similarity to the workflow. An embodiment includes constructing, using the ontology tree and the workflow data, a first skill tree corresponding to the workflow. An embodiment includes integrating, into an existing skill tree of an application, the first skill tree, the integrating resulting in an integrated skill tree of the application. An embodiment includes executing, responsive to an intent requesting execution of the skill using new data, using the integrated skill tree and the new data, the skill. Other embodiments of this aspect include corresponding computer systems, apparatus, and computer programs recorded on one or more computer storage devices, each configured to perform the actions of the embodiment. Thus, an embodiment provides ontology based workflow automation and execution.

A further embodiment includes validating the workflow data, the validating comprising confirming an intent associated with the workflow. Thus, an embodiment provides for validating workflow data used in ontology based workflow automation and execution.

A further embodiment includes validating the workflow data, the validating comprising confirming a user specificity of the workflow. Thus, an embodiment provides for validating workflow data used in ontology based workflow automation and execution.

A further embodiment includes validating the workflow data, the validating comprising removing a step in the workflow. Thus, an embodiment provides for validating workflow data used in ontology based workflow automation and execution.

In a further embodiment, constructing the first skill tree comprises adding a first node in the ontology tree to the first skill tree, the first node in the ontology tree corresponding to an action identified in the workflow data. Thus, an embodiment provides for additional detail of constructing a skill tree used in ontology based workflow automation and execution.

A further embodiment includes validating the first skill tree, the validating comprising removing a step in the first skill tree. Thus, an embodiment provides for validating a skill tree used in ontology based workflow automation and execution.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 9 depicts a flowchart of an example process for ontology based workflow automation and execution in accordance with an illustrative embodiment.

DETAILED DESCRIPTION

Figure 1:
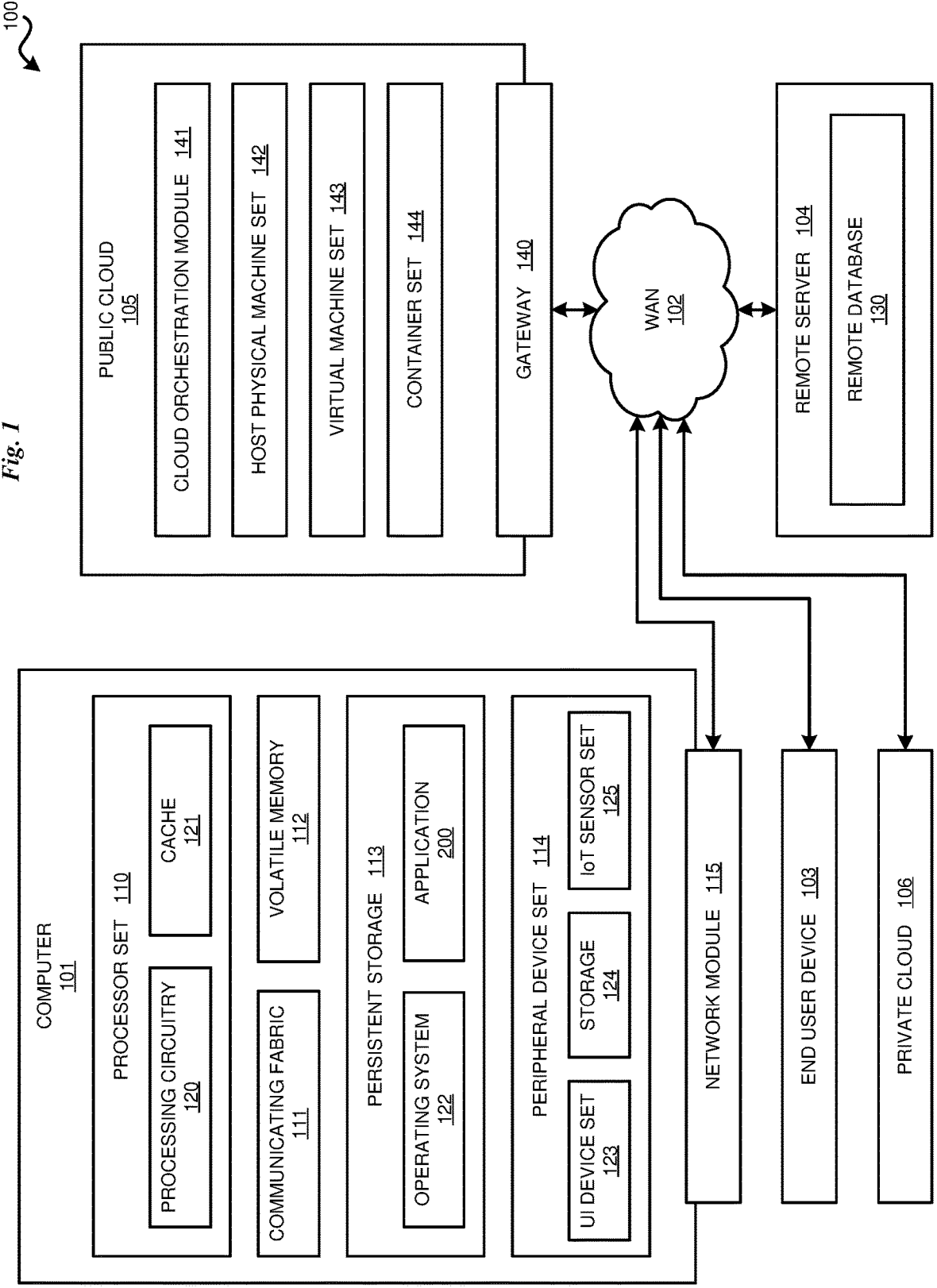
FIG. 1 depicts a block diagram of a computing environment in accordance with an illustrative embodiment.

The illustrative embodiments recognize that there is a need for a workflow automation implementation that does not rely on a scripting language, is simple for a non-technical user to "teach" an automation tool a new skill, and can be implemented by generalizing a single user demonstration of an example of the workflow to be automated. The present disclosure addresses the deficiencies described above by providing a process (as well as a system, method, machine-readable medium, etc.) that records execution of a workflow comprising a skill, the recording generating workflow data; selects, using the workflow data, an ontology tree having above a threshold amount of similarity to the workflow; constructs, using the ontology tree and the workflow data, a first skill tree corresponding to the workflow; integrates, into an existing skill tree of an application, the first skill tree, the integrating resulting in an integrated skill tree of the application; and executes, responsive to a intent requesting execution of the skill using new data, using the integrated skill tree and the new data, the skill. Thus, the illustrative embodiments provide for ontology based workflow automation and execution.

An illustrative embodiment records execution of a workflow including a skill the workflow is intended to automate. The recording generates workflow data. Some non-limiting examples of workflow data are the user interface actions recorded while a user demonstrates the workflow on a computing device, such as timestamped mouse clicks, mouse scrolls, key presses, and the active user interface window in which key presses, mouse activity, and other user interface activity occurs. Another non-limiting example of workflow data is audio data of a user's spoken description of the workflow, obtained while demonstrating the workflow or at a different time. Another non-limiting example of workflow data is screen capture data of the active user interface window, obtained while the user demonstrates the workflow. Another non-limiting example of workflow data is video data of the user as the user demonstrates the workflow. Another non-limiting example of workflow data is a Uniform Resource Locator (URL) of an active user interface window, if applicable, obtained while the user demonstrates the workflow. An embodiment uses one or more presently available techniques to record user interface actions and associate particular user interface actions with a particular user interface window. An embodiment uses a presently available speech-to-text conversion technique to convert audio data to corresponding text data. An embodiment uses a presently available character recognition technique to recognize a text label associated with a particular user interface action (e.g., a label near a text box the user types into or a label of a window the user clicks a mouse in).

One embodiment prompts a user to specify an intent associated with the skill being demonstrated, and receives and processes the user's response. In one embodiment, the user's response is in a structured form (e.g., by selecting a predefined intent or skill from a menu. In another embodiment, the user's response is in an utterance (an unstructured, natural language form, either in text or converted to text from another form) such as "start recording my demonstration of how to log time in our time management application") and the embodiment uses a presently available natural language understanding technique to simplify the input utterance to a generic intent representing the skill being demonstrated. If an embodiment does not have a skill mapped to the intent of the utterance, the embodiment defines a new skill invoked by the input utterance. Another embodiment does not prompt a user to specify an intent associated with the skill being demonstrated, but instead uses a presently available natural language understanding technique to extract an intent from the user's demonstration of a workflow. For example, a user might specify the intent during the demonstration (e.g., "now I'm going to demonstrate how to log time in our time management application").

One embodiment validates workflow data with a user. Some non-limiting examples of validating workflow data include confirming an intent of the workflow data, allowing a user to specify a privacy level or a restriction on distribution of a portion of the workflow data (e.g., a user's login credentials that may have been exposed during the demonstration), allowing a user to specify whether the workflow data is user-specific or generic to a group of users, allowing a user to edit recorded workflow data to adjust or remove a step (e.g., the user may have performed an extraneous action during the demonstration), allowing a user to confirm an embodiment's derivation of particular information (e.g., an intuited label and the label's context), and the like.

Using the (optionally validated) workflow data and a presently available natural language understanding technique, an embodiment sets values for two key-value pairs. One key-value pair has a key labelled as an application type, and a value denoting a particular application type associated with the workflow. For example, values for the application type might be "calendar" or "human resources management". Another key-value pair has a key labelled as an application, and a value denoting a particular application associated with the workflow. For example, values for the application might be particular calendar applications.

An embodiment has access to one or more ontology trees. An ontology tree is a tree-based hierarchical representation of steps that are common to a particular application type. An ontology tree's node objects or nodes represent one or more steps. A node includes a natural-language intent for a step, whether input is required from a user for a step and whether the input is user-specific or generic, and whether a step is optional or mandatory to a particular path in the tree representing a generic workflow of the application type. hierarchy in the ontology tree represents the pathways of various workflows in the application and their ordering. For example, an ontology tree might include, at the head node, a node representing a login step, and the tree might branch out to multiple possible next steps. An ontology tree is typically (but is not required to be) developed by a human expert.

An embodiment has access to one or more skill trees. Each skill tree is a hierarchical representation of learned skills within an application type and a specific application of an application type. Each node in a skill tree represents an action, and paths in the skill tree from node to node represent available paths which can be executed from a particular node.

One embodiment maintains a data structure including one or more nodes, in which each node is specific to a particular application type. A node includes a key referring to an application type, a pointer to the head node of an ontology tree for the application type, and one or more pointers each pointing to a head node of an existing skill tree for an application of the application type (or a placeholder for a pointer if no skill tree for a particular application currently exists). For example, a node for the calendar application type might include a pointer to an ontology tree for a calendar application type, and one or more pointers each pointing to a skill tree for a particular calendar application. The node structure allows for additional ontology trees and skills trees to be added in a modular fashion, as new application types are defined and new applications of an existing type are released or updated.

An embodiment selects, using the workflow data, an ontology tree having above a threshold amount of similarity to the workflow. One embodiment selects an ontology tree by using a presently available embedding technique to generate a word embedding (a numerical representation) of one or more words in the intent, and measuring a similarity between the generated word embedding with a word embedding of an ontology tree's key. One non-limiting example of a similarity measuring technique for embeddings is cosine similarity. One embodiment uses 0.75 as the threshold amount of similarity. Other thresholds are also possible and contemplated within the scope of the illustrative embodiments.

An embodiment constructs, using the ontology tree and the workflow data, a skill tree corresponding to the workflow. In particular, to construct a skill tree, an embodiment traverses a selected ontology tree depth first, and identifies one or more nodes in the ontology tree with corresponding actions in a recorded workflow. An embodiment assembles matched ontology tree nodes into a skill tree. In addition, an embodiment adds a recorded workflow action that does not correspond to an ontology tree node to the constructed skill tree. If there is a loop in the recorded workflow, an embodiment treats the loop as a series of sequential steps for simplicity. For example, if a recorded workflow includes an action at website X, then an action at website Y, then returning to website X, an embodiment includes three separate steps in the skill tree. An embodiment can use the constructed skill tree to re-execute actions as they were performed in the recorded workflow, but in a generalized fashion.

One embodiment validates a constructed skill tree with a user. Some non-limiting examples of validating a constructed skill tree include allowing a user to specify whether the skill tree is user-specific or generic to a group of users, allowing a user to edit the skill tree to adjust or remove a step (e.g., the user may have performed an extraneous action during the demonstration), allowing a user to confirm an embodiment's derivation of particular data in the skill tree (e.g., an intuited label and the label's context), and the like.

An embodiment integrates a constructed skill tree into an existing skill tree of an application, thus forming an integrated skill tree of the application. One embodiment traverses an existing skill tree of an application depth-first, until reaching a node matching a head node in the constructed skill tree, and inserts the constructed skill tree into the existing skill tree at the matching node. One embodiment also validates an insertion point of a constructed skill tree with a user.

An embodiment receives an intent requesting execution of the skill using new data, and in response uses the integrated skill tree and the new data to execute the skill. The received intent can be in a structured form (e.g., in a menu selection), or an unstructured, natural language form (e.g., "enter eight hours of vacation time for me into the time management application").

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 implementing ontology based workflow automation and execution. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
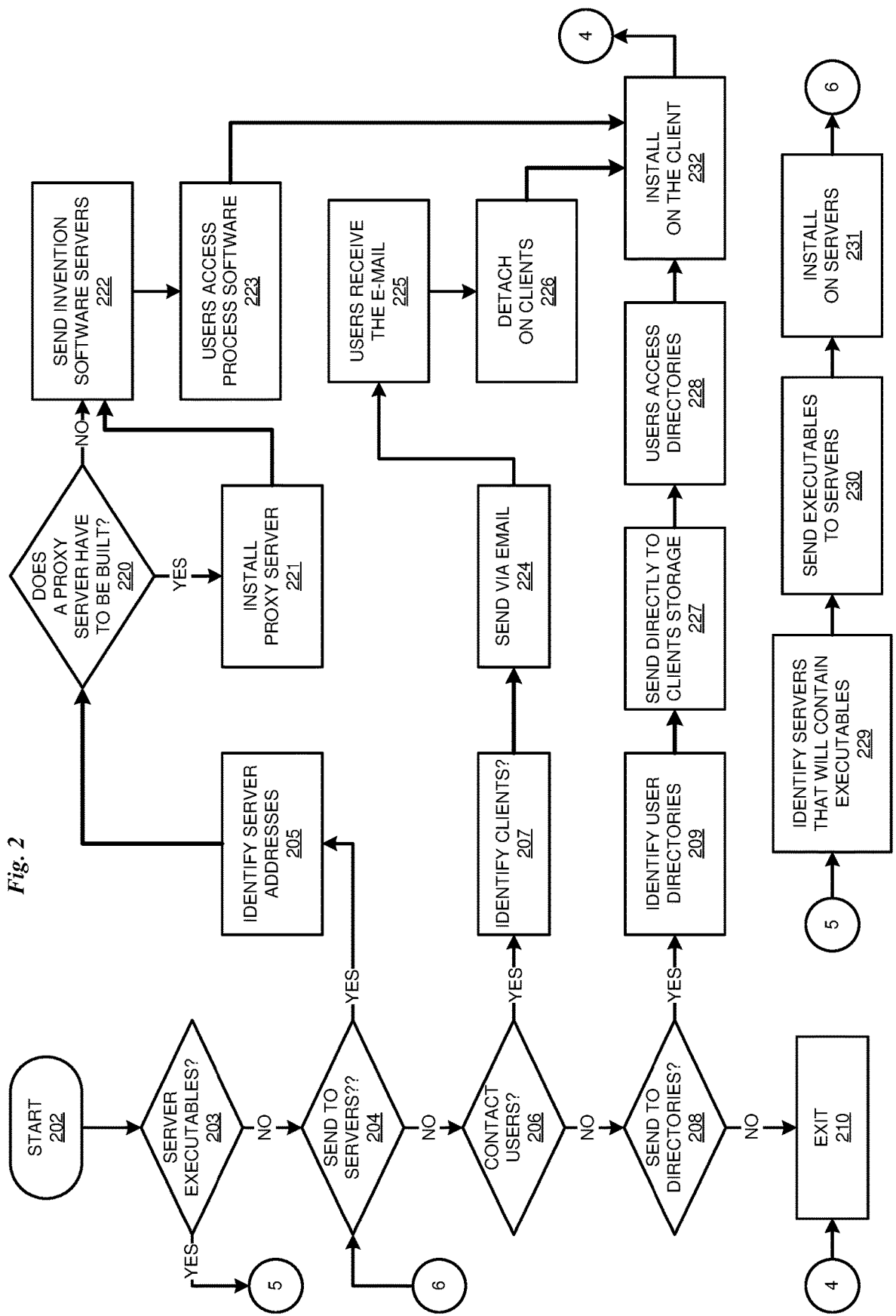
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing ontology based workflow automation and execution may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
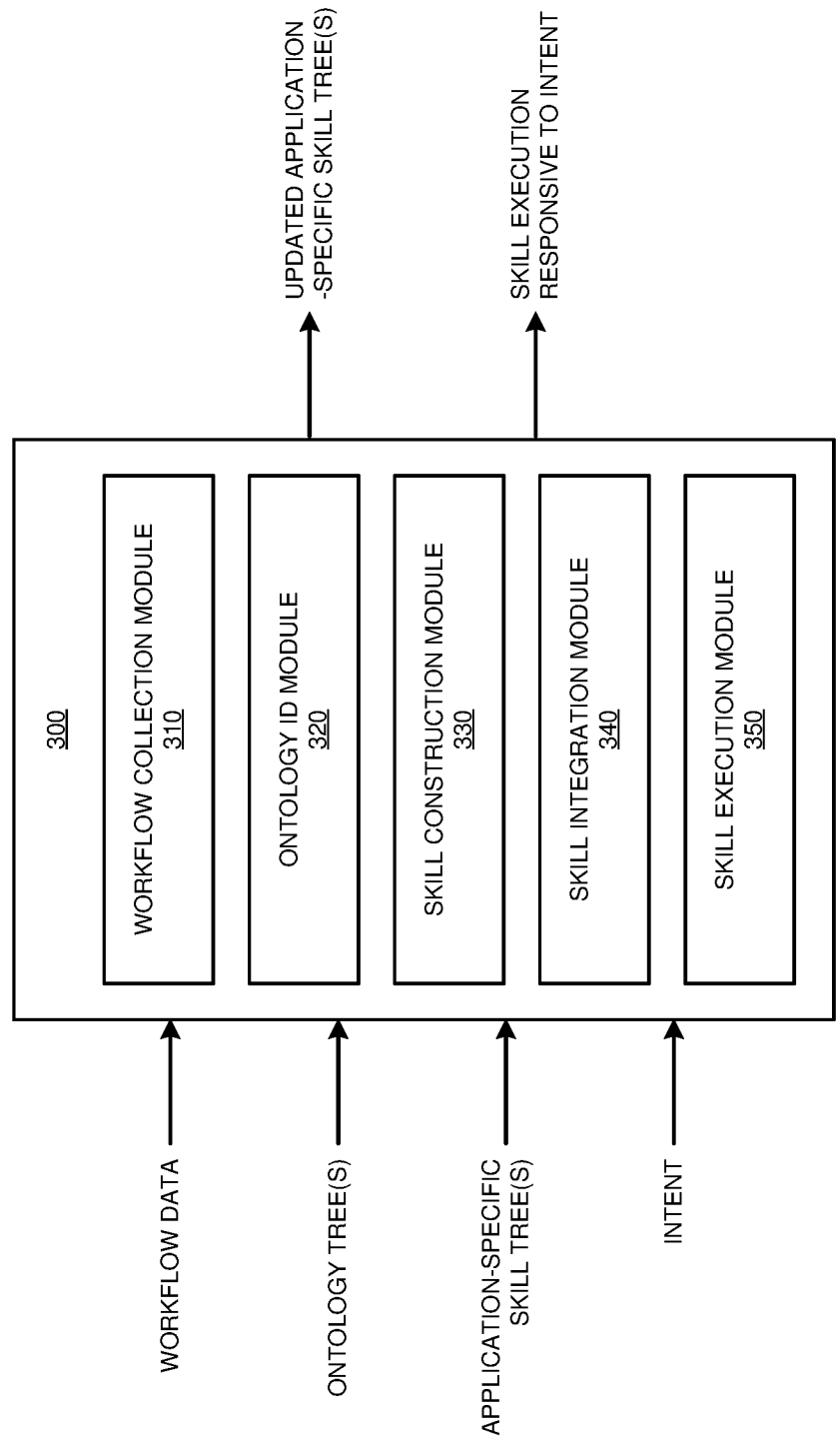
FIG. 3 depicts a block diagram of an example configuration for ontology based workflow automation and execution in accordance with an illustrative embodiment.

With reference to FIG. 3, this figure depicts a block diagram of an example configuration for ontology based workflow automation and execution in accordance with an illustrative embodiment. Application 300 is the same as application 200 in FIG. 1.

In the illustrated embodiment, workflow collection module 310 records execution of a workflow including a skill the workflow is intended to automate. The recording generates workflow data. Some non-limiting examples of workflow data are the user interface actions recorded while a user demonstrates the workflow on a computing device, such as timestamped mouse clicks, mouse scrolls, key presses, and the active user interface window in which key presses, mouse activity, and other user interface activity occurs. Another non-limiting example of workflow data is audio data of a user's spoken description of the workflow, obtained while demonstrating the workflow or at a different time. Another non-limiting example of workflow data is screen capture data of the active user interface window, obtained while the user demonstrates the workflow. Another non-limiting example of workflow data is video data of the user as the user demonstrates the workflow. Another non-limiting example of workflow data is a Uniform Resource Locator (URL) of an active user interface window, if applicable, obtained while the user demonstrates the workflow. Module 310 uses one or more presently available techniques to record user interface actions and associate particular user interface actions with a particular user interface window. Module 310 uses a presently available speech-to-text conversion technique to convert audio data to corresponding text data. Module 310 uses a presently available character recognition technique to recognize a text label associated with a particular user interface action (e.g., a label near a text box the user types into or a label of a window the user clicks a mouse in).

One implementation of module 310 prompts a user to specify an intent associated with the skill being demonstrated, and receives and processes the user's response. In one implementation of module 310, the user's response is in a structured form (e.g., by selecting a predefined intent or skill from a menu. In another implementation of module 310, the user's response is in an utterance (an unstructured, natural language form, either in text or converted to text from another form) such as "start recording my demonstration of how to log time in our time management application") and the implementation uses a presently available natural language understanding technique to simplify the input utterance to a generic intent representing the skill being demonstrated. If module 310 does not have a skill mapped to the intent of the utterance, module 310 defines a new skill invoked by the input utterance. Another implementation of module 310 does not prompt a user to specify an intent associated with the skill being demonstrated, but instead uses a presently available natural language understanding technique to extract an intent from the user's demonstration of a workflow. For example, a user might specify the intent during the demonstration (e.g., "now I'm going to demonstrate how to log time in our time management application").

One implementation of module 310 validates workflow data with a user. Some non-limiting examples of validating workflow data include confirming an intent of the workflow data, allowing a user to specify a privacy level or a restriction on distribution of a portion of the workflow data (e.g., a user's login credentials that may have been exposed during the demonstration), allowing a user to specify whether the workflow data is user-specific or generic to a group of users, allowing a user to edit recorded workflow data to adjust or remove a step (e.g., the user may have performed an extraneous action during the demonstration), allowing a user to confirm a derivation of particular information (e.g., an intuited label and the label's context), and the like.

Using the (optionally validated) workflow data and a presently available natural language understanding technique, module 310 sets values for two key-value pairs. One key-value pair has a key labelled as an application type, and a value denoting a particular application type associated with the workflow. For example, values for the application type might be "calendar" or "human resources management". Another key-value pair has a key labelled as an application, and a value denoting a particular application associated with the workflow. For example, values for the application might be particular calendar applications.

Ontology identification (ID) module 320 has access to one or more ontology trees. An ontology tree is a tree-based hierarchical representation of steps that are common to a particular application type. An ontology tree's node objects or nodes represent one or more steps. A node includes a natural-language intent for a step, whether input is required from a user for a step and whether the input is user-specific or generic, and whether a step is optional or mandatory to a particular path in the tree representing a generic workflow of the application type. hierarchy in the ontology tree represents the pathways of various workflows in the application and their ordering. For example, an ontology tree might include, at the head node, a node representing a login step, and the tree might branch out to multiple possible next steps. An ontology tree is typically (but is not required to be) developed by a human expert.

Skill construction module 330 has access to one or more skill trees. Each skill tree is a hierarchical representation of learned skills within an application type and a specific application of an application type. Each node in a skill tree represents an action, and paths in the skill tree from node to node represent available paths which can be executed from a particular node.

One implementation of application 300 maintains a data structure including one or more nodes, in which each node is specific to a particular application type. A node includes a key referring to an application type, a pointer to the head node of an ontology tree for the application type, and one or more pointers each pointing to a head node of an existing skill tree for an application of the application type (or a placeholder for a pointer if no skill tree for a particular application currently exists). For example, a node for the calendar application type might include a pointer to an ontology tree for a calendar application type, and one or more pointers each pointing to a skill tree for a particular calendar application. The node structure allows for additional ontology trees and skills trees to be added in a modular fashion, as new application types are defined and new applications of an existing type are released or updated.

Module 320 selects, using the workflow data, an ontology tree having above a threshold amount of similarity to the workflow. One implementation of module 320 selects an ontology tree by using a presently available embedding technique to generate a word embedding (a numerical representation) of one or more words in the intent, and measuring a similarity between the generated word embedding with a word embedding of an ontology tree's key. One non-limiting example of a similarity measuring technique for embeddings is cosine similarity. One implementation of module 320 uses 0.75 as the threshold amount of similarity. Other thresholds are also possible.

Module 330 constructs, using the ontology tree and the workflow data, a skill tree corresponding to the workflow. In particular, to construct a skill tree, module 330 traverses a selected ontology tree depth first, and identifies one or more nodes in the ontology tree with corresponding actions in a recorded workflow. Module 330 assembles matched ontology tree nodes into a skill tree. In addition, module 330 adds a recorded workflow action that does not correspond to an ontology tree node to the constructed skill tree. If there is a loop in the recorded workflow, module 330 treats the loop as a series of sequential steps for simplicity. For example, if a recorded workflow includes an action at website X, then an action at website Y, then returning to website X, module 330 includes three separate steps in the skill tree. Module 330 can use the constructed skill tree to re-execute actions as they were performed in the recorded workflow, but in a generalized fashion.

Module 330 validates a constructed skill tree with a user. Some non-limiting examples of validating a constructed skill tree include allowing a user to specify whether the skill tree is user-specific or generic to a group of users, allowing a user to edit the skill tree to adjust or remove a step (e.g., the user may have performed an extraneous action during the demonstration), allowing a user to confirm an embodiment's derivation of particular data in the skill tree (e.g., an intuited label and the label's context), and the like.

Skill integration module 340 integrates a constructed skill tree into an existing skill tree of an application, thus forming an integrated skill tree of the application. One implementation of module 340 traverses an existing skill tree of an application depth-first, until reaching a node matching a head node in the constructed skill tree, and inserts the constructed skill tree into the existing skill tree at the matching node. One implementation of module 340 also validates an insertion point of a constructed skill tree with a user.

Skill execution module 350 receives an intent requesting execution of the skill using new data, and in response uses the integrated skill tree and the new data to execute the skill. The received intent can be in a structured form (e.g., in a menu selection), or an unstructured, natural language form (e.g., "enter eight hours of vacation time for me into the time management application").

Figure 4:
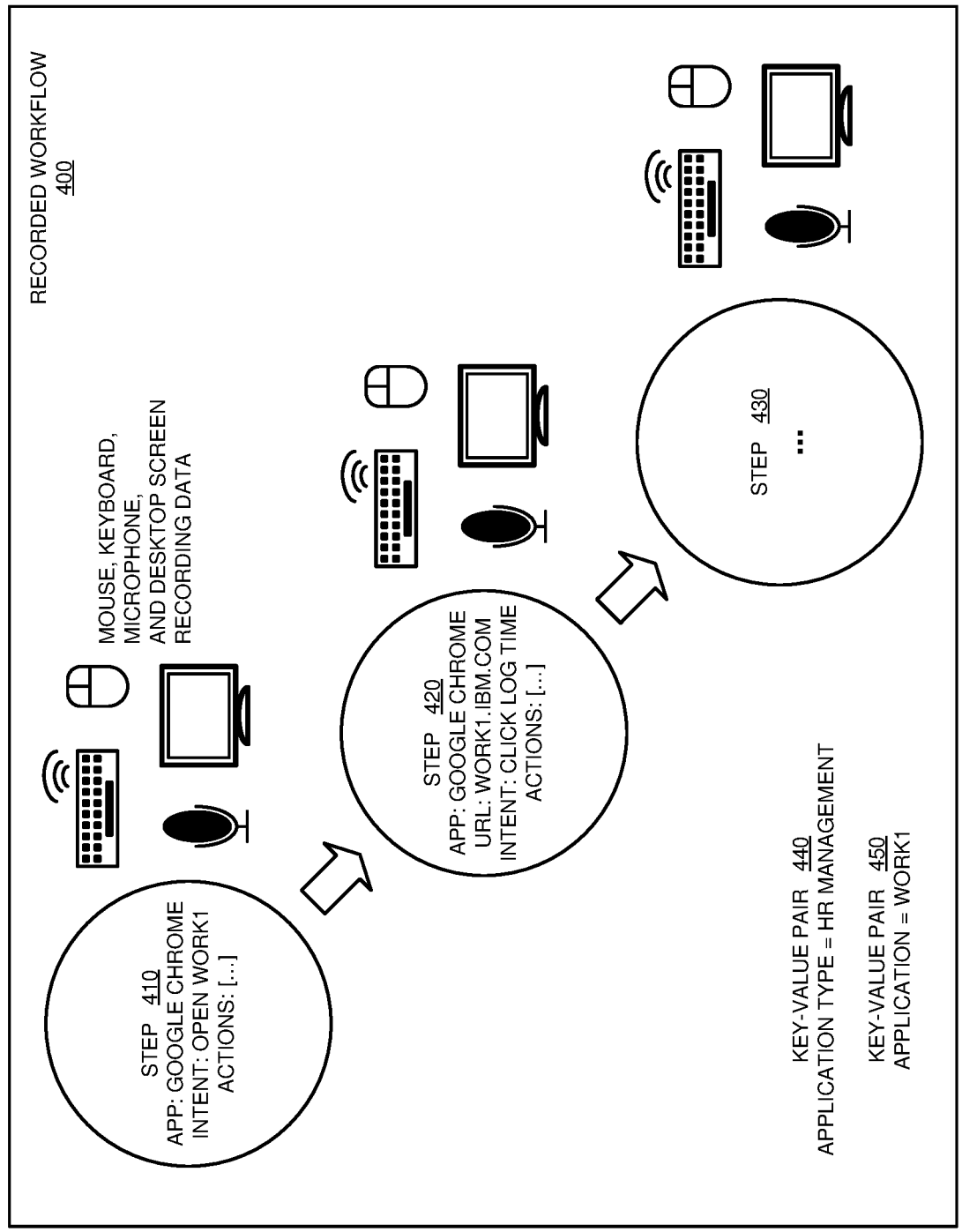
FIG. 4 depicts an example of ontology based workflow automation and execution in accordance with an illustrative embodiment.

With reference to FIG. 4, this figure depicts an example of ontology based workflow automation and execution in accordance with an illustrative embodiment. The example can be executed using application 300 in FIG. 3.

As depicted, recorded workflow 400 includes steps 410, 420, and 430. Note that the applications and URLs depicted are only simplified examples, and not intended to be limiting to the invention. Using the (optionally validated) workflow data and a presently available natural language understanding technique, key-value pair 440 (labelled as an application type) and key-value pair 450 (labelled as an application) have also been set.

Figure 5:
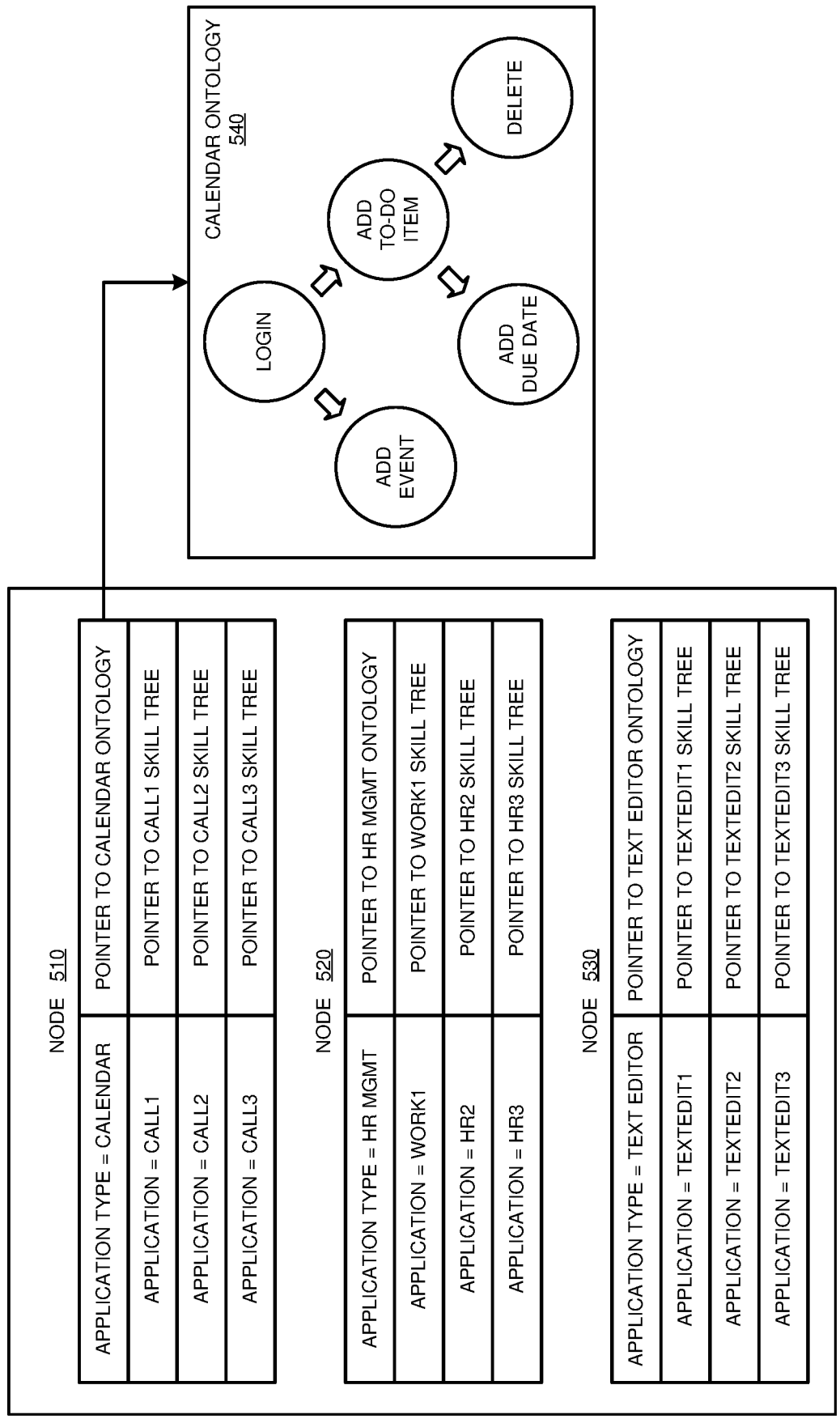
FIG. 5 depicts another example of ontology based workflow automation and execution in accordance with an illustrative embodiment.

With reference to FIG. 5, this figure depicts another example of ontology based workflow automation and execution in accordance with an illustrative embodiment. The example can be executed using application 300 in FIG. 3.

Ontology datastore 500 includes nodes 510, 520, and 530. Each node is specific to a particular application type. A node includes a key referring to an application type, a pointer to the head node of an ontology tree for the application type, and one or more pointers each pointing to a head node of an existing skill tree for an application of the application type (or a placeholder for a pointer if no skill tree for a particular application currently exists). For example, node 510 (for the calendar application type) includes a pointer to calendar ontology 540, an ontology for a calendar application type, and one or more pointers each pointing to a skill tree for a particular calendar application.

Figure 6:
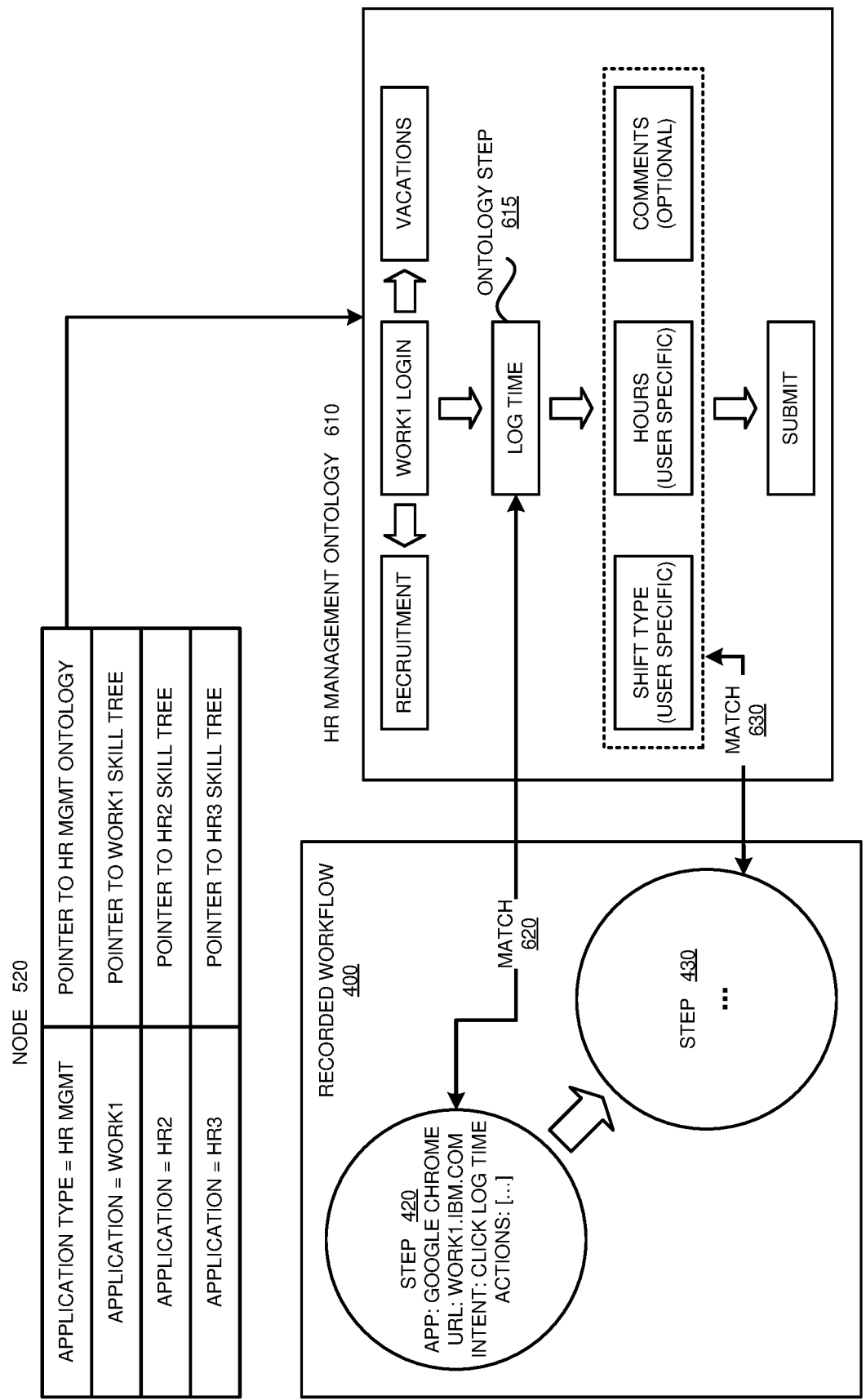
FIG. 6 depicts a continued example of ontology based workflow automation and execution in accordance with an illustrative embodiment.

With reference to FIG. 6, this figure depicts a continued example of ontology based workflow automation and execution in accordance with an illustrative embodiment. Recorded workflow 400 and steps 420 and 430 are the same as recorded workflow 400 and steps 420 and 430 in FIG. 4. Node 520 is the same as node 520 in FIG. 5.

Node 520 includes a pointer to human resources (HR) management ontology 610, which has above a threshold amount of similarity to recorded workflow 400. In particular, application 300 traverses ontology 610 depth first and identifies one or more nodes in the ontology tree with corresponding actions in step 420 (indicated by match 620, matching step 420 with ontology step 615) and step 430 (indicated by match 630).

Figure 7:
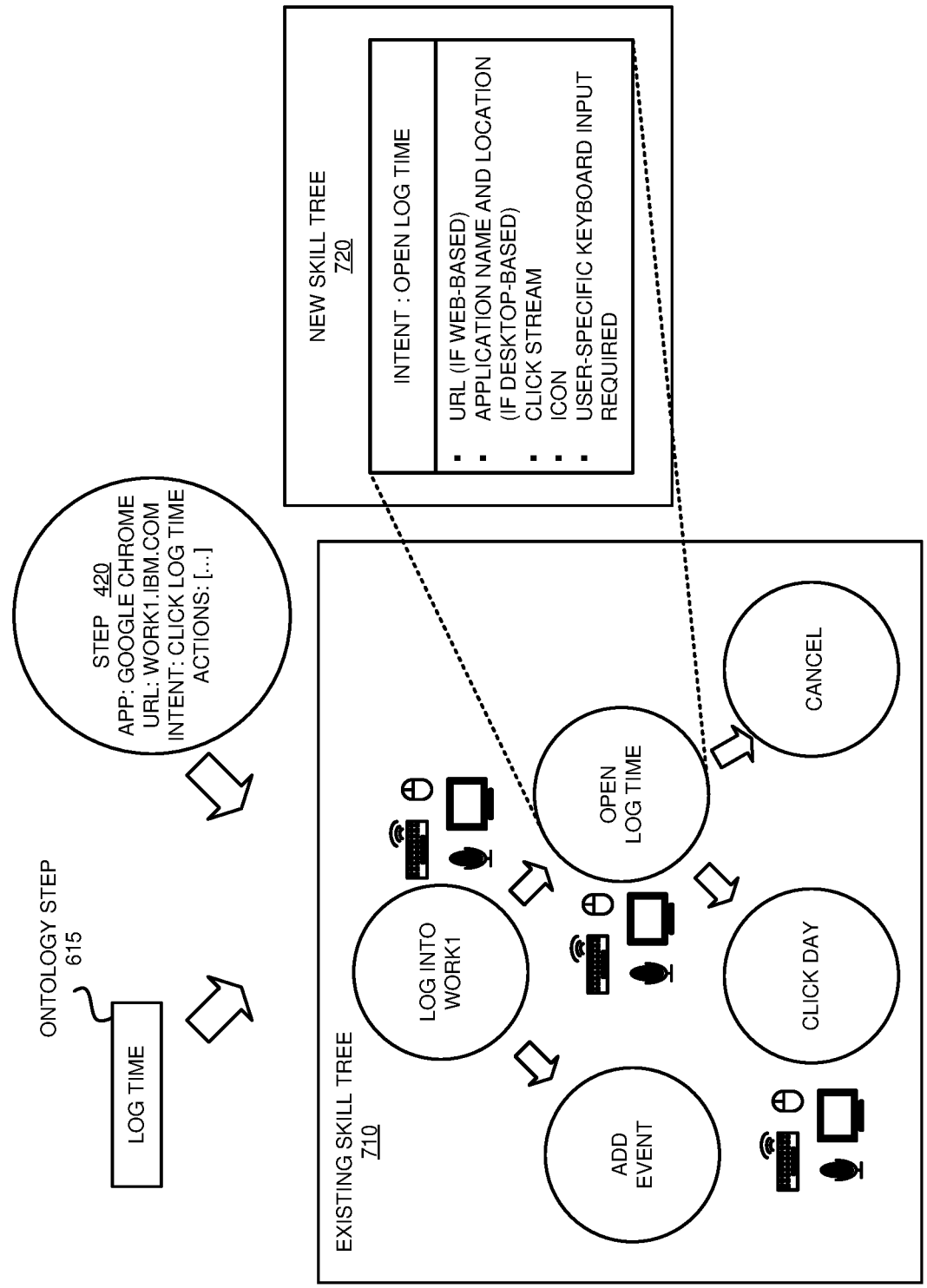
FIG. 7 depicts a continued example of ontology based workflow automation and execution in accordance with an illustrative embodiment.

With reference to FIG. 7, this figure depicts a continued example of ontology based workflow automation and execution in accordance with an illustrative embodiment. Step 420 is the same as step 420 in FIG. 4. Ontology step 615 is the same as ontology step 615 in FIG. 6.

As depicted, using ontology step 615 and step 420 (from recorded workflow 400 in FIG. 4), application 300 has selected existing skill tree 710, and inserted new skill tree 720 into existing skill tree 710.

Figure 8:
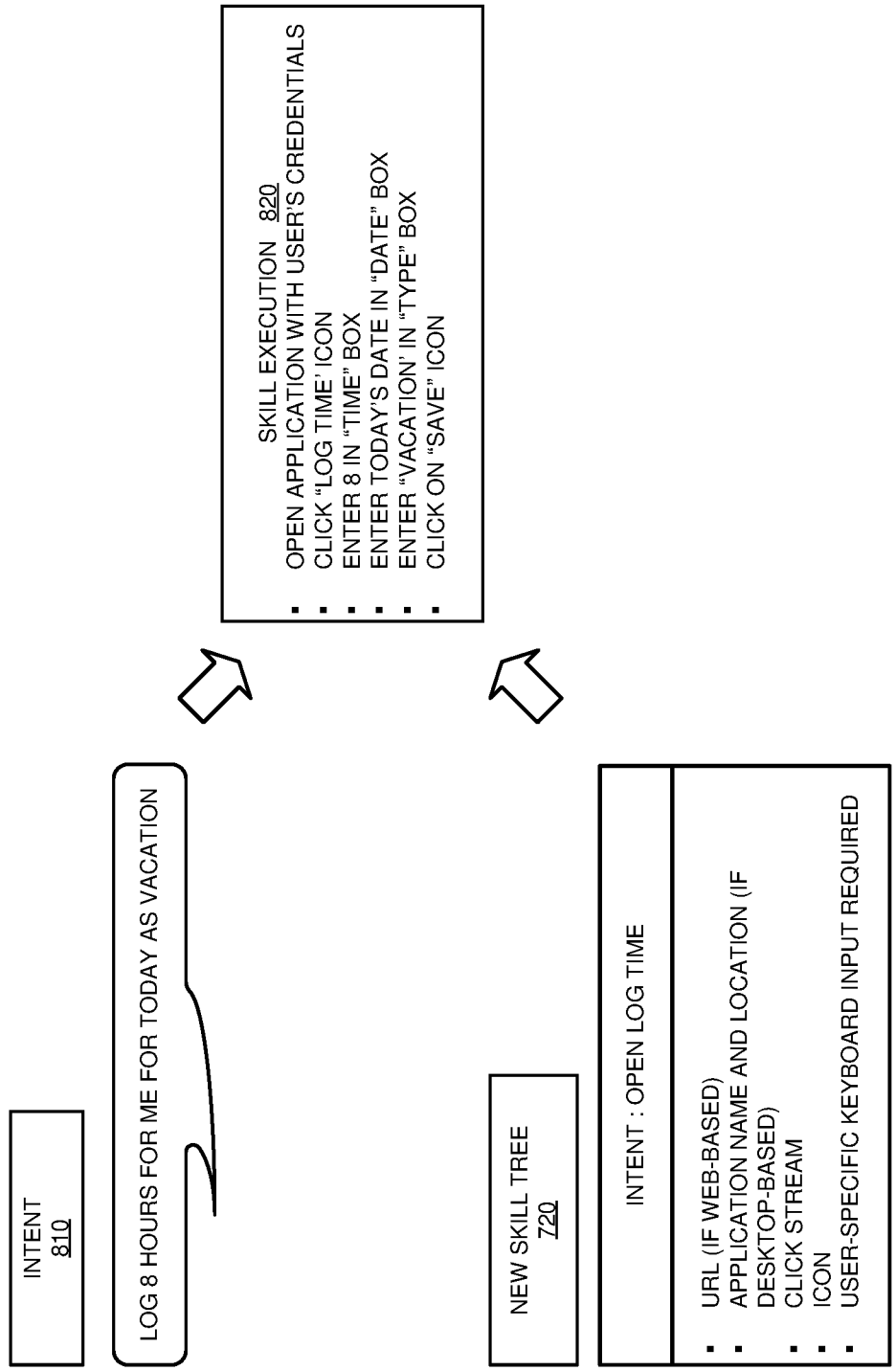
FIG. 8 depicts a continued example of ontology based workflow automation and execution in accordance with an illustrative embodiment.

With reference to FIG. 8, this figure depicts a continued example of ontology based workflow automation and execution in accordance with an illustrative embodiment. New skill tree 720 is the same as new skill tree 720 in FIG. 7.

Here, application 300 has received intent 810, an intent requesting execution of a skill using new data. In response, application 300 uses new skill tree 720 (part of a now-integrated skill tree) and intent 810 to execute the skill (depicted as skill execution 820).

With reference to FIG. 9, this figure depicts a flowchart of an example process for ontology based workflow automation and execution in accordance with an illustrative embodiment. Process 900 can be implemented in application 300 in FIG. 3.

In the illustrated embodiment, at block 902, the process records execution of a workflow comprising a skill, the recording generating workflow data. At block 904, the process selects, using the workflow data, an ontology tree having above a threshold amount of similarity to the workflow. At block 906, the process constructs, using the ontology tree and the workflow data, a first skill tree corresponding to the workflow. At block 908, the process integrates, into an existing skill tree of an application, the first skill tree, the integrating resulting in an integrated skill tree of the application. At block 910, the process executes, responsive to an intent requesting execution of the skill using new data, using the integrated skill tree and the new data, the skill. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   enabling a new skill in a workflow automation relative to an application without scripting, the implementing comprising
      recording from a demonstration by a user, an execution of an example workflow comprising the new skill to be implemented in the workflow automation, the recording generating workflow data;
      constructing an ontology tree comprising a node configured to specifically correspond to an application type of the application relative to which the workflow automation is to be performed, wherein the node is further configured to comprise a reference to a head node of the ontology tree and a reference to an existing skill tree of the application;
      selecting, using the workflow data and responsive to the ontology tree having above a threshold amount of similarity to the workflow, the ontology tree;
      constructing, using the ontology tree and the workflow data, a first skill tree corresponding to the workflow;
      integrating, into the existing skill tree of the application, the first skill tree, the integrating resulting in an integrated skill tree of the application, the integrating causing the new skill to become available in the workflow automation relative to the application; and
   executing with the application, responsive to a request for execution of the new skill using new data, the new skill using the integrated skill tree and the new data.

2. The computer-implemented method of claim 1, further comprising:
   validating the workflow data, the validating comprising confirming an intent associated with the workflow.

3. The computer-implemented method of claim 1, further comprising:
   validating the workflow data, the validating comprising confirming a user specificity of the workflow.

4. The computer-implemented method of claim 1, further comprising:
   validating the workflow data, the validating comprising removing a step in the workflow.

5. The computer-implemented method of claim 1, wherein constructing the first skill tree comprises adding a first node in the ontology tree to the first skill tree, the first node in the ontology tree corresponding to an action identified in the workflow data.

6. The computer-implemented method of claim 1, further comprising:
   validating the first skill tree, the validating comprising removing a step in the first skill tree.

7. A computer program product comprising one or more computer readable storage media, and program instructions collectively stored on the one or more computer readable storage media, the program instructions executable by a processor to cause the processor to perform operations comprising:
   enabling a new skill in a workflow automation relative to an application without scripting, the implementing comprising
      recording from a demonstration by a user, an execution of an example workflow comprising the new skill to be implemented in the workflow automation, the recording generating workflow data;
      constructing an ontology tree comprising a node configured to specifically correspond to an application type of the application relative to which the workflow automation is to be performed, wherein the node is further configured to comprise a reference to a head node of the ontology tree and a reference to an existing skill tree of the application;
      selecting, using the workflow data and responsive to the ontology tree having above a threshold amount of similarity to the workflow, the ontology tree;
      constructing, using the ontology tree and the workflow data, a first skill tree corresponding to the workflow;
      integrating, into the existing skill tree of the application, the first skill tree, the integrating resulting in an integrated skill tree of the application, the integrating causing the new skill to become available in the workflow automation relative to the application; and
      executing with the application, responsive to a request for execution of the new skill using new data, the new skill using the integrated skill tree and the new data.

8. The computer program product of claim 7, wherein the program instructions are stored in a computer readable storage device in a server data processing system, and wherein the program instructions are downloaded in response to a request over a network to a remote data processing system for use in a computer readable storage device associated with the remote data processing system, the operations further comprising:
   metering a use of the program instructions associated with the request; and
   generating an invoice based on the metered use.

9. The computer program product of claim 7, further comprising:
   validating the workflow data, the validating comprising confirming an intent associated with the workflow.

10. The computer program product of claim 7, further comprising:
    validating the workflow data, the validating comprising confirming a user specificity of the workflow.

11. The computer program product of claim 7, further comprising:
    validating the workflow data, the validating comprising removing a step in the workflow.

12. The computer program product of claim 7, wherein constructing the first skill tree comprises adding a first node in the ontology tree to the first skill tree, the first node in the ontology tree corresponding to an action identified in the workflow data.

13. The computer program product of claim 7, further comprising:
    validating the first skill tree, the validating comprising removing a step in the first skill tree.

14. A computer system comprising a processor and one or more computer readable storage media, and program instructions collectively stored on the one or more computer readable storage media, the program instructions executable by the processor to cause the processor to perform operations comprising:
    enabling a new skill in a workflow automation relative to an application without scripting, the implementing comprising recording from a demonstration by a user, an execution of an example workflow comprising the new skill to be implemented in the workflow automation, the recording generating workflow data;

constructing an ontology tree comprising a node configured to specifically correspond to an application type of the application relative to which the workflow automation is to be performed, wherein the node is further configured to comprise a reference to a head node of the ontology tree and a reference to an existing skill tree of the application;

selecting, using the workflow data and responsive to the ontology tree having above a threshold amount of similarity to the workflow, the ontology tree;

constructing, using the ontology tree and the workflow data, a first skill tree corresponding to the workflow;

integrating, into the existing skill tree of the application, the first skill tree, the integrating resulting in an integrated skill tree of the application, the integrating causing the new skill to become available in the workflow automation relative to the application; and executing with the application, responsive to a request for execution of the new skill using new data, the new skill using the integrated skill tree and the new data.

15. The computer system of claim 14, further comprising: validating the workflow data, the validating comprising confirming an intent associated with the workflow.

16. The computer system of claim 14, further comprising: validating the workflow data, the validating comprising confirming a user specificity of the workflow.

17. The computer system of claim 14, further comprising: validating the workflow data, the validating comprising removing a step in the workflow.

18. The computer system of claim 14, wherein constructing the first skill tree comprises adding a first node in the ontology tree to the first skill tree, the first node in the ontology tree corresponding to an action identified in the workflow data.

19. The computer system of claim 14, further comprising: validating the first skill tree, the validating comprising removing a step in the first skill tree.

\* \* \* \* \*